United States Patent
Funahashi et al.

(10) Patent No.: US 11,500,369 B2
(45) Date of Patent: Nov. 15, 2022

(54) OPERATION/MAINTENANCE MANAGEMENT METHOD, PROGRAM, AND OPERATION/MAINTENANCE MANAGEMENT SYSTEM

(71) Applicants: MITSUBISHI HEAVY INDUSTRIES, LTD., Tokyo (JP); Mitsubishi Hitachi Power Systems, Ltd., Kanagawa (JP)

(72) Inventors: Satoru Funahashi, Tokyo (JP); Shintaro Kumano, Tokyo (JP); Katsuhiko Abe, Yokohama (JP); Keisuke Yamamoto, Tokyo (JP); Makoto Kishi, Tokyo (JP); Yukihiko Inoue, Tokyo (JP); Shun Niizuma, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 689 days.

(21) Appl. No.: 16/494,814

(22) PCT Filed: Mar. 22, 2018

(86) PCT No.: PCT/JP2018/011459
§ 371 (c)(1),
(2) Date: Sep. 17, 2019

(87) PCT Pub. No.: WO2018/180904
PCT Pub. Date: Oct. 4, 2018

(65) Prior Publication Data
US 2020/0278671 A1    Sep. 3, 2020

(30) Foreign Application Priority Data

Mar. 29, 2017    (JP) .............................. JP2017-065958

(51) Int. Cl.
*G05B 23/02*    (2006.01)
*F02C 9/00*    (2006.01)

(52) U.S. Cl.
CPC ............ *G05B 23/0283* (2013.01); *F02C 9/00* (2013.01); *F05D 2260/80* (2013.01)

(58) Field of Classification Search
CPC ... G05B 23/0283; F02C 9/00; F05D 2260/80; G06Q 10/0639; G06Q 10/20
See application file for complete search history.

(56) References Cited

U.S. PATENT DOCUMENTS

2011/0196593 A1    8/2011    Jiang et al.
2020/0143487 A1*   5/2020    Mashio ................ G06Q 50/265
(Continued)

FOREIGN PATENT DOCUMENTS

| JP | 11-142298 | 5/1999 |
| JP | 2003-99119 | 4/2003 |

(Continued)

OTHER PUBLICATIONS

International Search Report dated May 1, 2018 in corresponding International (PCT) Application No. PCT/JP2018/011459, with English translation.

(Continued)

*Primary Examiner* — Sizo B Vilakazi
(74) *Attorney, Agent, or Firm* — Wenderoth, Lind & Ponack, L.L.P.

(57) ABSTRACT

An operation/maintenance management method of an integrated system including a plurality of components or devices includes selecting an index and a period for evaluating the integrated system, acquiring prediction information for input information for use in computation of the index, creating a future prediction scenario by combining the input information, computing an evaluation index related to the scenario, (Continued)

and comparing and displaying evaluation index computation results related to a plurality of scenarios.

15 Claims, 10 Drawing Sheets

(56) References Cited

U.S. PATENT DOCUMENTS

2020/0278671 A1\* 9/2020 Funahashi ................. F02C 9/00
2022/0189476 A1\* 6/2022 Takano ................... G10L 15/22

FOREIGN PATENT DOCUMENTS

| JP | 2007-257376 | 10/2007 |
| JP | 2014-106627 | 6/2014 |
| JP | 2016-192064 | 11/2016 |

OTHER PUBLICATIONS

Written Opinion of the International Searching Authority dated May 1, 2018 in corresponding International (PCT) Application No. PCT/JP2018/011459, with English translation.

\* cited by examiner

OPERATION/MAINTENANCE MANAGEMENT METHOD, PROGRAM, AND OPERATION/MAINTENANCE MANAGEMENT SYSTEM

TECHNICAL FIELD

The present invention relates to an operation/maintenance management method, a program, and an operation/maintenance management system. Priority is claimed on Japanese Patent Application No. 2017-65958, filed Mar. 29, 2017, the content of which is incorporated herein by reference.

BACKGROUND ART

An integrated system including a plurality of components or devices such as an industrial plant including a gas turbine or an aircraft is required to systematically perform maintenance and upgrades in order to maintain a proper operation state and secure economic efficiency.

For example, Patent Document 1 describes that a state of an operating gas turbine is accurately identified on the basis of information related to the state of the operating gas turbine and a maintenance plan is set.

CITATION LIST

Patent Literature

[Patent Document 1]
United States Patent Application, Publication No. 2011/0196593
[Patent Document 2]
Japanese Unexamined Patent Application, First Publication No. 2014-106627

SUMMARY OF INVENTION

Technical Problem

In an integrated system including a plurality of components or devices such as an industrial plant including a gas turbine or an aircraft, the risk of the occurrence of performance degradation at the time of continuation of an operation or the occurrence of an unexpected failure is high. Thus, there is a possibility that a business operator who owns the integrated system will suffer an economic loss due to performance degradation or the like.

For example, although it is possible to accurately identify a state of a gas turbine in operation and create a maintenance plan or the like according to the technology described in Patent Document 1, no maintenance plan has been set in consideration of future causes of variation related to economic efficiency such as performance degradation.

For example, according to the technology described in Patent Document 2, economic efficiency evaluation is performed using information such as prices and the life of components, which leads to a proposal of an upgrade or the like. To further pursue the maximization of economic efficiency, it is important to reflect device information such as performance degradation of a component held by a manufacturer and operation information of an asset plan, an operation plan, a maintenance plan, and the like held by a business operator as a future cause of variation in economic evaluation. However, because the device information and the operation information include highly confidential details for a company such as the latest technology and future prediction, it may not necessarily be possible to disclose all information for both the manufacturer and the business operator. Thus, interactive and comprehensive considerations for information are not sufficient and a consideration of optimization of an evaluation index is limited. Furthermore, because information about a future variation is a plan or prediction, it is necessary to consider various options and possibilities. Also, an operation/maintenance plan is generally created individually for each device constituting the integrated system and it is not easy to adjust and optimize the entire integrated system.

The present invention provides an operation/maintenance management method, a program, and an operation/maintenance management system capable of solving the above-described problems.

Solution to Problem

According to a first aspect of the present invention, there is provided an operation/maintenance management method of an integrated system including a plurality of components or devices, the operation/maintenance management method including steps of: selecting an index and a period for evaluating the integrated system; acquiring prediction information representing a change over time in input information for use in computation of the index; creating a future prediction scenario by combining the input information; and computing an evaluation index related to the scenario.

The operation/maintenance management method according to a second aspect of the present invention further includes steps of: displaying the future prediction scenario; and comparing and displaying evaluation index computation results related to a plurality of scenarios.

In the operation/maintenance management method according to a third aspect of the present invention, in a step of acquiring prediction information representing the change over time in the input information, a part or all of the input information is able to be input by an input interface in a fill-in form.

In the operation/maintenance management method according to a fourth aspect of the present invention, in a step of acquiring prediction information representing the change over time in the input information, information may be simplified to details capable of being disclosed by a holder with respect to a part or all of the input information and be incorporated into the scenario.

In the operation/maintenance management method according to a fifth aspect of the present invention, in a step of creating the future prediction scenario, prediction information of a change over time in certain input information may be adjusted on the basis of prediction information of a change over time in other input information.

In the operation/maintenance management method according to a sixth aspect of the present invention, a part or all of the input information may be corrected with reference to a current state of the integrated system as a starting value of prediction information of a change over time.

In the operation/maintenance management method according to a seventh aspect of the present invention, a part or all of the input information may be corrected or diverted with reference to actual results of a previous change over time in the integrated system as prediction information of a change over time.

In the operation/maintenance management method according to an eighth aspect of the present invention, the input information may include maintenance plan information of the integrated system.

In the operation/maintenance management method according to a ninth aspect of the present invention, the input information may include operation plan information of the integrated system.

In the operation/maintenance management method according to a tenth aspect of the present invention, the input information may include prediction information of a change over time in performance of the integrated system.

In the operation/maintenance management method according to an eleventh aspect of the present invention, the index may be evaluated on the basis of a lost profit due to performance degradation of the integrated system and a cost required for improving performance of the integrated system.

In the operation/maintenance management method according to a twelfth aspect of the present invention, a repair or maintenance plan may be set on the basis of the lost profit due to the performance degradation of the integrated system and the cost required for improving the performance of the integrated system.

In the operation/maintenance management method according to a thirteenth aspect of the present invention, the integrated system may be a power generation facility, and the index may be evaluated on the basis of a lost profit from a sum of a decreased profit due to a decrease in power generation efficiency, an increased cost due to an increase in power consumption in the facility, and an increased cost due to an increase in a failure occurrence rate and a sum of a cost required for a repair or component replacement and a cost caused by stopping an operation for maintenance.

According to a fourteenth aspect of the present invention, there is provided a program for causing a computer of an operation/maintenance management system of an integrated system including a plurality of components or devices to function as: a means for acquiring an index and a period for evaluating the integrated system; a means for acquiring prediction information representing a change over time in input information for use in computation of the index; a means for creating a future prediction scenario by combining the input information; and a means for computing an evaluation index related to the scenario.

According to a fifteenth aspect of the present invention, there is provided an operation/maintenance management system of an integrated system including a plurality of components or devices, the operation/maintenance management system including: a setting information reception unit configured to acquire an index and a period for evaluating the integrated system; a prediction information acquisition unit configured to acquire prediction information representing a change over time in input information for use in computation of the index; a scenario computation unit configured to create a future prediction scenario by combining the input information; and an evaluation index computation unit configured to compute an evaluation index related to the scenario.

Advantageous Effects of Invention

According to the above-described operation/maintenance management method, program, and operation/maintenance management system, it is possible to share information necessary for computation of an index to be pursued in the business between business operators and manufacturers in order to optimize an evaluation index of an integrated system. As a result, more advanced optimization of an evaluation index in which operation information and device information of each component of an integrated system are comprehensively reflected is implemented. Furthermore, options and uncertainties in future prediction are represented in individual scenarios, which provide useful insights in decision making for operation and maintenance plans of an integrated system.

DESCRIPTION OF EMBODIMENTS

Embodiment

Hereinafter, an operation/maintenance management method of an integrated system according to the present invention will be described with reference to FIGS. 1 to 11.

Figure 1:
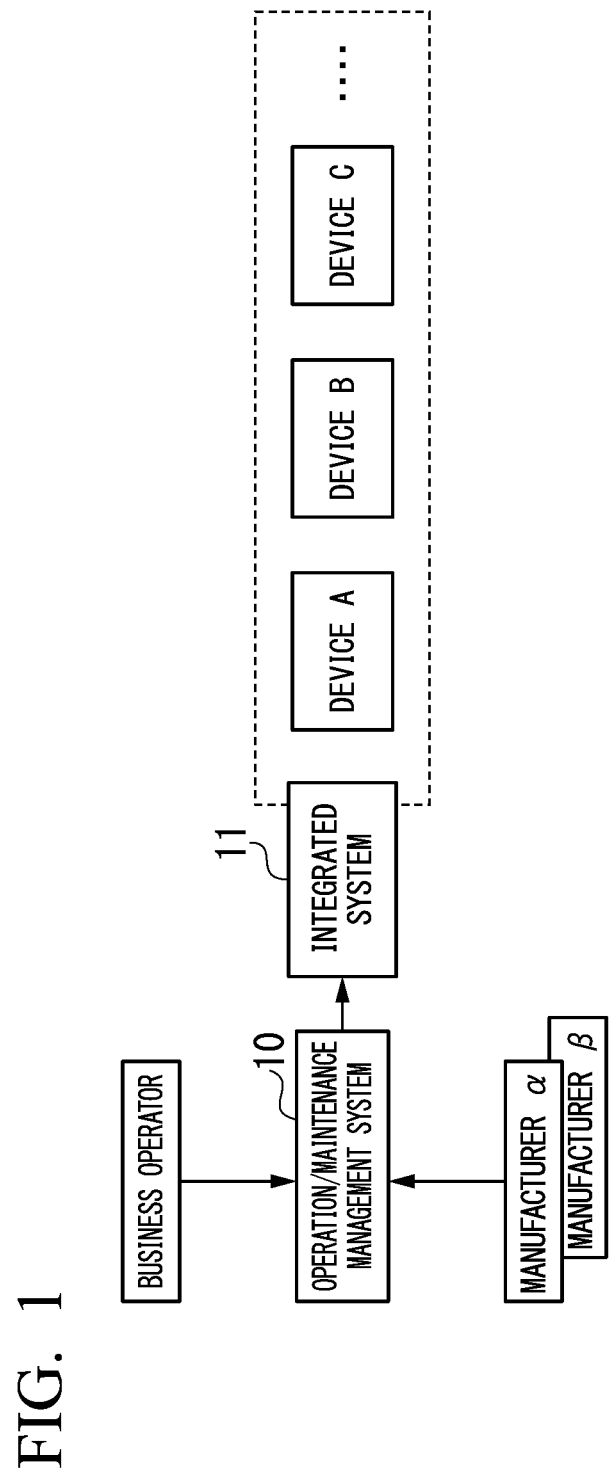
FIG. 1 is an explanatory diagram showing a relation to an integrated system of a business operator or a manufacturer in an operation/maintenance management method of the present invention.

FIG. 1 is an explanatory diagram showing a relation to an integrated system of a business operator or a manufacturer in the operation/maintenance management method of the present invention.

An operation/maintenance management system 10 shown in FIG. 1 generates an operation plan and a maintenance plan for an integrated system including a plurality of devices and generates information for supporting decision making for an operation. First, a conventional operation/maintenance method will be described for a comparison with an operation/maintenance method of the integrated system 11 in the present embodiment.

Figure 11:
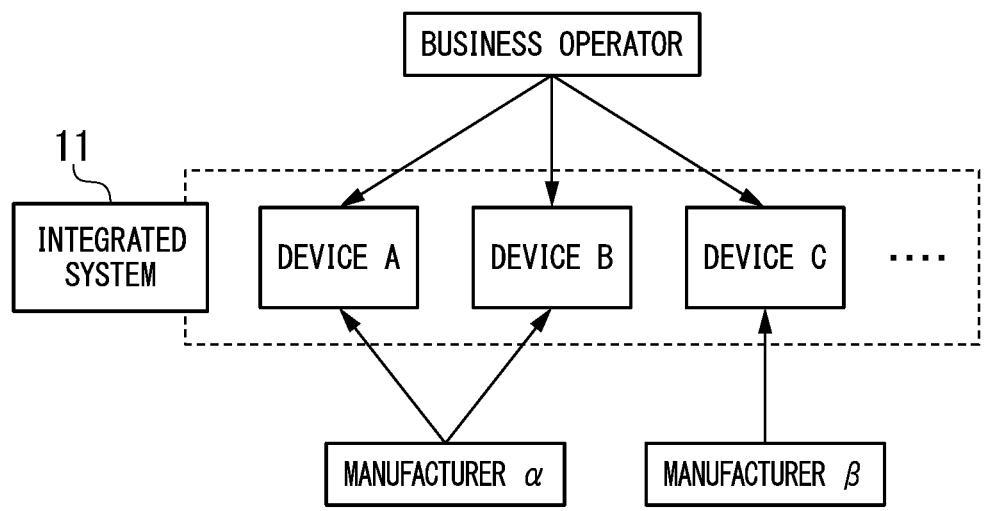
FIG. 11 is an explanatory diagram showing a relation to an integrated system of a business operator or a manufacturer in a conventional operation/maintenance management method.

FIG. 11 is an explanatory diagram showing a relation to an integrated system of a business operator or a manufacturer in a conventional operation/maintenance management method.

The business operator shown in FIG. 11 is an entity that operates an integrated system 11. The business operator performs an operation and management on each device of the integrated system 11. A manufacturer α and a manufacturer β are manufacturers of a plurality of devices provided in the integrated system 11. For example, the manufacturer α manufactures a device A and a device B and monitors and maintains the device A and the device B. The manufacturer β is a manufacturer of a device C and monitors and maintains the device C. In this manner, the operation is conventionally performed according to a maintenance plan prepared by the business operator itself or himself/herself or maintenance plans proposed by the manufacturer α and the manufacturer β for the devices in charge. Therefore, it is not necessarily clear whether the maintenance work is performed during an optimum period or whether details of the maintenance work are appropriate, for example, when viewed from an economic viewpoint as a whole.

The operation of the integrated system 11 of the present embodiment will be described with reference to FIG. 1. In the present embodiment, the business operator inputs an operation plan for the entire system planned by the business operator itself or himself/herself and the like to the operation/maintenance management system 10. The manufacturer α and the manufacturer β input a service plan and the like for each device to the operation/maintenance management system 10. The operation/maintenance management system 10 is a platform for combining plans input by the business operator, the manufacturer α, and the like and creating a prediction scenario for an evaluation index related to an operation of the integrated system 11, and an operation plan, a maintenance plan, and the like optimized for the evaluation index. Here, for example, when the evaluation index is an economic profit or the like, the operation/maintenance management system 10 creates an operation plan and the like in consideration of economic efficiency based on knowledge possessed by the business operator, the manufacturer α, and the like. The business operator, the manufacturer α, and the manufacturer β operate the integrated system 11 on the basis of their operation plans and the like.

Here, the prediction scenario includes, for example, prediction of performance degradation, a failure, or the like due to aging degradation of a device included in the integrated system 11 such as a device A or prediction information or the like of an economic loss imposed on the business operator due to the performance degradation, the failure or the like of the device, in addition to information related to prediction of a factor variation necessary for decision making of an operation of the integrated system such as a fuel price and product demand. The optimized operation plan is, for example, an appropriate operation plan obtained in consideration of a relation to an economic profit obtained by a business operator through an operation of the integrated system 11, an economic loss due to performance degradation or the like of a device, a cost required for maintenance of the device (replacement, an upgrade, or the like).

The integrated system 11 is, for example, an industrial plant such as a gas turbine, an aircraft, or the like. Hereinafter, a case in which the integrated system 11 is a power generation plant will be described as an example.

Figure 2:
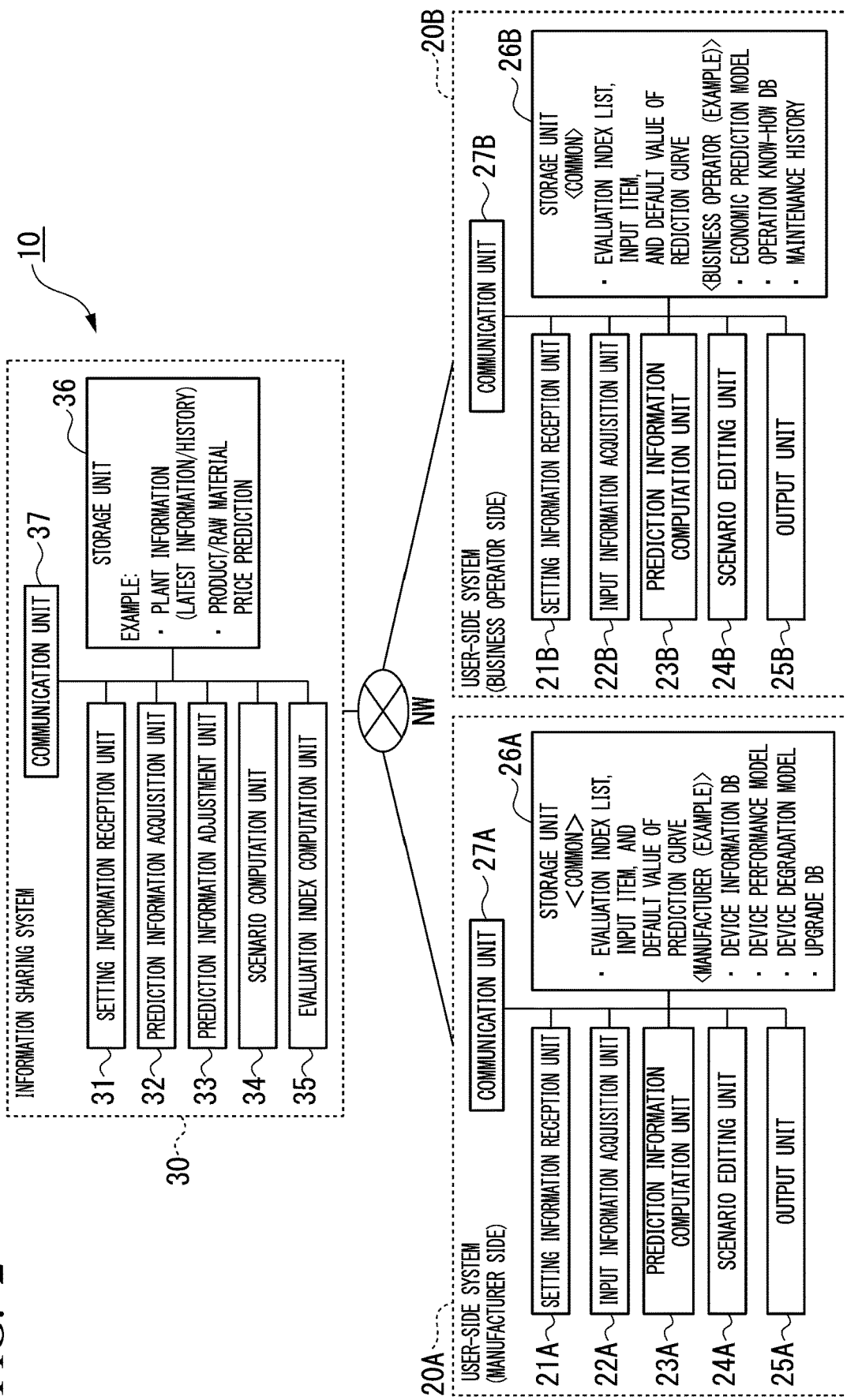
FIG. 2 is a functional block diagram showing an example of an embodiment of the operation/maintenance management method of the integrated system according to the present invention.

FIG. 2 is a functional block diagram showing an example of an embodiment of the operation/maintenance management method of the integrated system according to the present invention.

The operation/maintenance management system 10 shown in FIG. 2 is configured to include user-side systems 20A and 20B and an information sharing system 30. The user-side systems 20A and 20B and the information sharing system 30 include a computer such as a server terminal device. The user-side system 20A, the user-side system 20B, and the information sharing system 30 are connected via a network so that communication is possible. The user-side system 20A is possessed by a manufacturer that manufactures the devices included in the integrated system 11. Confidential information of components of a device manufactured by the manufacturer and the like may be recorded in the user-side system 20A. The user-side system 20B is possessed by the business operator holding the integrated system 11. Highly confidential asset plan information, operation plan information (hereinafter simply referred to as an operation plan), maintenance plan information (hereinafter simply referred to as a maintenance plan), or the like held by the business operator may be recorded in the user-side system 20B. On the other hand, data shared by the manufacturer and the business operator is recorded in the information sharing system 30. The information sharing system 30 performs a process such as creation of a prediction scenario and an operation plan interactively and comprehensively using information mutually publicly available to the manufacturer and the business operator.

Although only one user-side system 20A is described in FIG. 2, the user-side system 20A is individually possessed by each manufacturer related to a device provided in the integrated system 11.

As shown in FIG. 2, the user-side system 20A includes a setting information reception unit 21A, an input information acquisition unit 22A, a prediction information computation unit 23A, a scenario editing unit 24A, an output unit 25A, a storage unit 26A, and a communication unit 27A.

The setting information reception unit 21A receives an input of an index and an evaluation period for use in evaluation of the integrated system.

The input information acquisition unit 22A receives an input of information necessary for maintenance of a device, an upgrade proposal of a component, or the like such as a change in performance in the device, performance of an upgraded component, or price information. The input information acquisition unit 22A acquires device operation information obtained by monitoring the device (information representing an operation state of the device detected by a sensor provided in the device).

The prediction information computation unit 23A computes prediction information representing a change over time in performance of the device or the like.

The scenario editing unit 24A displays various types of scenario information created by the information sharing system 30 (hereinafter simply referred to as a scenario). The scenario editing unit 24A receives an editing operation on the displayed scenario.

The output unit 25A outputs the scenario generated by the scenario editing unit 24A to a display or the like.

The storage unit 26A stores various types of information. For example, a device information database (DB) including a price of the device and the like, a device performance model representing performance of the device, a device degradation model representing a change over time in the device performance, an upgrade DB including information of an upgraded component for a component included in the device, and the like are recorded in the storage unit 26A. The information may be a manufacturer's confidential information. The storage unit 26A stores a list of evaluation indices received by the setting information reception unit 21A, each item of input information acquired by the input information acquisition unit 22A, and a default value of a prediction curve displayed by the scenario editing unit 24A. The default value indicates a state in which no editing is performed.

The storage unit 26A may be a storage device provided in the user-side system 20A or may be an external storage device (for example, a storage device of a data center or the like).

The communication unit 27A communicates with other devices.

The user-side system 20B includes a setting information reception unit 21B, an input information acquisition unit 22B, a prediction information computation unit 23B, a scenario editing unit 24B, an output unit 25B, a storage unit 26B, and a communication unit 27B.

The setting information reception unit 21B receives an input of an index and an evaluation period for use in evaluation of the integrated system.

The input information acquisition unit 22B receives an input of information such as an operation plan, a maintenance plan, and the like of the integrated system 11 and fuel price prediction, demand prediction, and the like necessary for creating the operation plan, the maintenance plan, and the like of the integrated system 11.

The prediction information computation unit 23B computes, for example, prediction information representing the change in the fuel price during the evaluation period on the basis of a predicted value of the fuel price during a certain future period acquired by the input information acquisition unit 22B. The prediction information computation unit 23B computes prediction information representing a transition in the evaluation period of the profit obtained by the operation of the integrated system 11, for example, when there is a demand according to the demand prediction acquired by the input information acquisition unit 22B.

The scenario editing unit 24B displays a scenario created by the information sharing system 30. An editing operation on the displayed scenario is received.

The output unit 25B outputs and displays the scenario generated by the scenario editing unit 24B to and on the display.

The storage unit 26B stores various types of information. For example, the storage unit 26B stores a fuel or demand prediction model, an operation know-how DB configured to accumulate the business operator's operation know-how, previous maintenance history information for the integrated system 11, and the like. Such information may be confidential information of the business operator. The storage unit 26B stores a list of evaluation indices received by the setting information reception unit 21B, each item of input information acquired by the input information acquisition unit 22B, and a default value of the scenario displayed by the scenario editing unit 24B. The storage unit 26B may be a storage device provided in the user-side system 20B or an external storage device.

The communication unit 27B communicates with other devices.

The information sharing system 30 includes a setting information reception unit 31, a prediction information acquisition unit 32, a prediction information adjustment unit 33, a scenario computation unit 34, an evaluation index computation unit 35, a storage unit 36, and a communication unit 37.

The setting information reception unit 31 acquires setting information such as an index and an evaluation period acquired by the setting information reception unit 21A from the user-side system 20A. Likewise, the setting information reception unit 31 acquires setting information such as an index and an evaluation period from the user-side system 20B.

The prediction information acquisition unit 32 acquires device performance prediction information and the like computed by the prediction information computation unit 23A from the user-side system 20A. Likewise, the prediction information acquisition unit 32 acquires prediction information such as the fuel price computed by the prediction information computation unit 23B and the profit obtained by the operation of the integrated system 11 from the user-side system 20B. The prediction information acquisition unit 32 acquires an operation plan and a maintenance plan from the user-side system 20B.

The prediction information adjustment unit 33 adjusts various types of prediction information acquired by the prediction information acquisition unit 32.

The scenario computation unit 34 computes a scenario for aggregating a plurality of pieces of prediction information acquired by the prediction information acquisition unit 32 and the prediction information after adjustment of the prediction information adjustment unit 33 and computing an evaluation index for use in evaluation of the operation of the integrated system 11. For example, when the evaluation index is a "fuel cost", the scenario computation unit 34 computes a scenario representing a change in a required fuel cost when a power generation plant is operated in an operation plan on the basis of the operation plan and the fuel price prediction information acquired by the prediction information acquisition unit 32.

The evaluation index computation unit 35 computes an evaluation index for the scenario computed by the scenario computation unit 34.

The storage unit 36 stores various information capable of being shared by the manufacturer and the business operator. For example, the storage unit 36 stores the latest operation information of the integrated system 11, a history of previous operation information, predicted values of a device and a raw material price, and the like. The storage unit 36 may be a storage device provided in the user-side system 20A or 20B, or may be an external storage device.

The communication unit 37 communicates with other devices.

The information sharing system 30 acquires various types of information related to the operation of the integrated system 11 from the user-side systems 20A and 20B, and computes an evaluation index. Next, a flow of an evaluation index computation process of the information sharing system 30 will be described.

Figure 3:
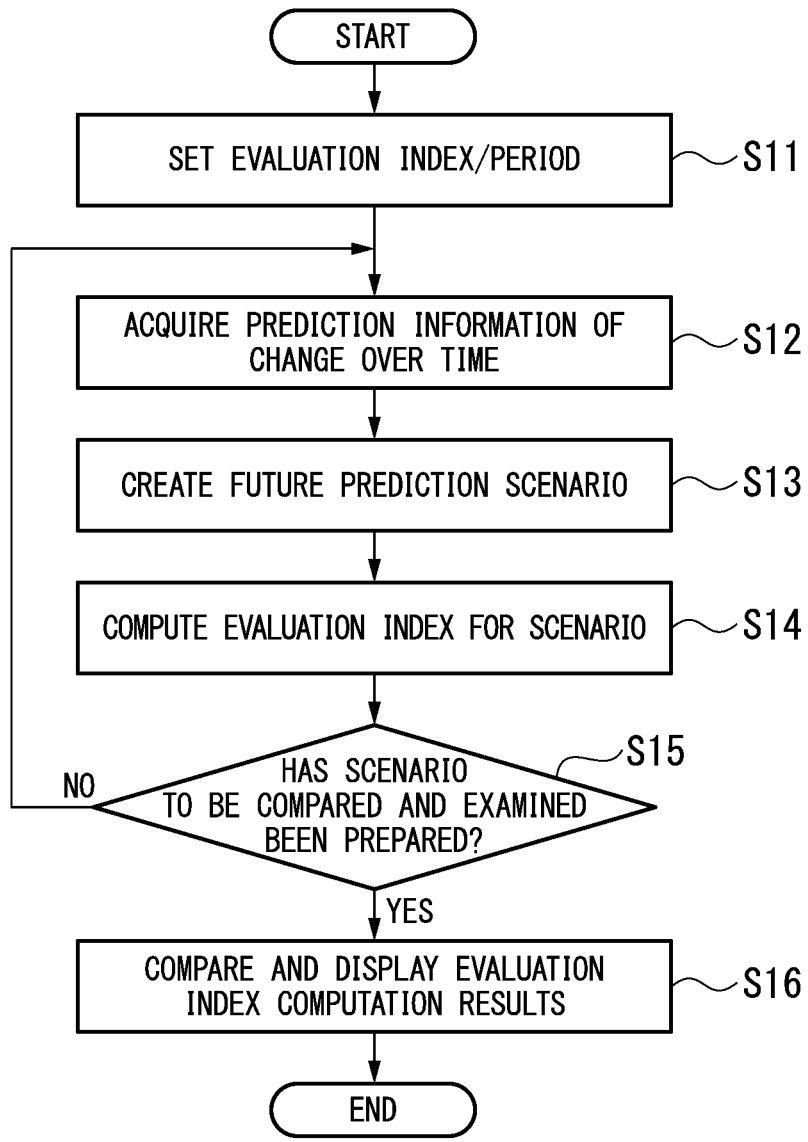
FIG. 3 is a flowchart showing an example of an embodiment of the operation/maintenance management method of the integrated system according to the present invention.

FIG. 3 is a flowchart showing an example of an embodiment of the operation/maintenance management method of the integrated system according to the present invention.

First, the setting information reception unit 31 of the information sharing system 30 acquires and sets an evaluation index and a period from the user-side systems 20A and 20B via the communication unit 37 (step S11). For example, information such as a "fuel cost" which is an evaluation index and "five years" which are a period is set. Next, the prediction information acquisition unit 32 acquires prediction information in consideration of a change over time from the user-side system 20A or 20B via the communication unit 37 (step S12). For example, the prediction information acquisition unit 32 acquires performance prediction information for the next five years in consideration of changes over time in the devices A, B, and C of the power generation plant (the integrated system 11) from the user-side system 20A. For example, the prediction information acquisition unit 32 acquires prediction information of an operation plan for the future five years and a fuel price for the future five years necessary for power generation, and the like from the user-side system 20B.

Next, the scenario computation unit 34 creates a future prediction scenario (step S13). The prediction scenario may include prediction information for computing an evaluation index (a "fuel cost") such as fuel and product prices and include prediction information acquired from the user-side systems 20A and 20B, processing information computed therefrom, or prediction information of a final evaluation index. The prediction information is simplified to details capable of being disclosed by the holder and the scenario is represented by a function having a variable of time-series data or time or the like. For example, the processing information is an expected curve graph showing a "change in the fuel cost" for the future five years obtained by multiplying an amount of power generation indicated by the operation plan by the fuel price. The fact that the final evaluation index may be included indicates that, for example, when the evaluation index is the "fuel cost", the above-described prediction curve graph representing the "change in the fuel cost" is a scenario. The scenario and the evaluation index will be described below using examples.

Next, the evaluation index computation unit 35 computes an evaluation index for the scenario (step S14). For example, the evaluation index computation unit 35 computes a value of the evaluation index "fuel cost" by totaling the fuel cost during the evaluation period in the prediction curve graph representing the "change in the fuel cost".

Next, the scenario computation unit 34 determines whether or not a scenario to be compared and examined has been prepared (step S15). For example, the evaluation index "fuel cost" is simulated with respect to a certain type of "fuel price prediction", a certain type of "performance prediction", and candidates of three types of "operation plans" (operation plans A, B, and C). If the best operation plan among the three types of "operation plans" is selected from a viewpoint of the "fuel cost", the scenario to be compared and examined is a prediction scenario of the "fuel cost" for the three types of "operation plans". When the scenario to be compared and examined has not been prepared, the processing from step S12 is iterated until the scenario to be compared and examined has been prepared. When the scenario to be compared and examined has been prepared, all fuel costs for the five years is computed on the basis of a prediction curve (a scenario) representing the change in the fuel cost for the future five years of the operation plans A, B, and C. The evaluation index computation unit 35 transmits the computed evaluation index to the user-side systems 20A and 20B via the communication unit 37. In the user-side system 20A, the output unit 25A compares and displays evaluation index computation results (step S16). For example, the output unit 25A outputs information such as X yen in the case of the operation plan A, Y yen in the case of the operation plan B, Z yen in the case of the operation plan C, and the like. The same also applies to the user-side system 20B.

Next, a flow of an overall process of the entire operation/maintenance management system 10 in an evaluation index computation process will be described with reference to FIG. 4.

Figure 4:
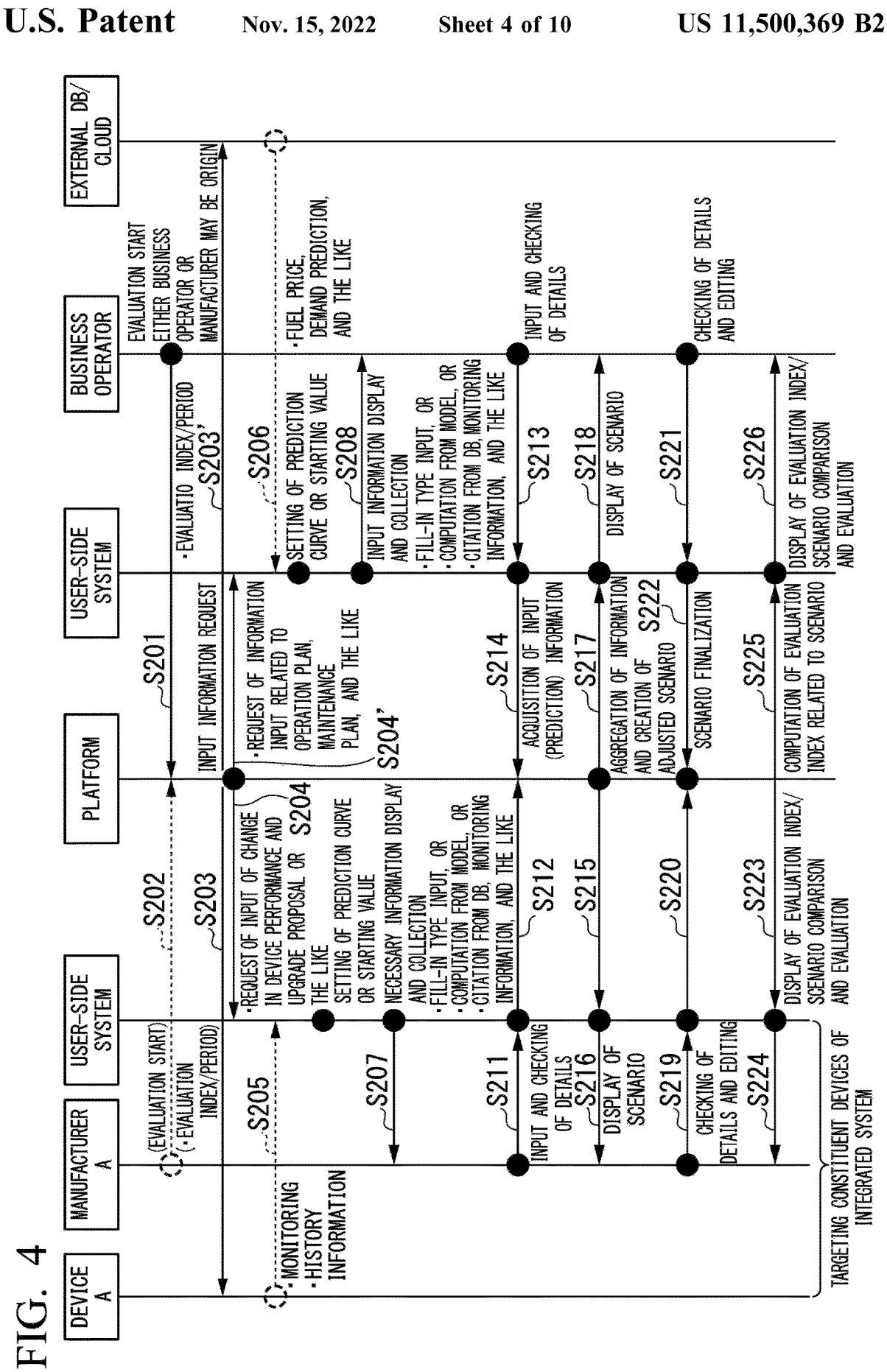
FIG. 4 is a sequence diagram showing an example of an embodiment of the operation/maintenance management method of the integrated system according to the present invention.

FIG. 4 is a sequence diagram showing an example of an embodiment of the operation/maintenance management method of the integrated system according to the present invention.

In the sequence diagram shown in FIG. 4, the storage unit 26B of the user-side system 20B is configured as an external storage device (which may be, for example, a storage device provided in a so-called cloud computing system).

First, the business operator uses the user-side system 20B to start an evaluation process (step S201). Specifically, the business operator inputs information of an evaluation index (for example, a "fuel cost") and an evaluation period (for example, "five years") to the user-side system 20B. Then, the setting information reception unit 21B acquires the information and transmits the information to the information sharing system 30 via the communication unit 27B. In the information sharing system 30, the setting information reception unit 31 acquires the information via the communication unit 37 and records the information in the storage unit 36. This process may be performed by a manufacturer (step S202).

Next, the prediction information acquisition unit 32 of the information sharing system 30 requests input information from the device A (step S203). The prediction information acquisition unit 32 requests the external storage device to provide input information (step S203'). The prediction information acquisition unit 32 requests the user-side system 20A to provide input information such as information representing a change in device performance, upgrade proposal information (such as performance and a price of an upgraded component), and the like (step S204). The prediction information acquisition unit 32 requests the user-side system 20B to provide input information such as an operation plan and a maintenance plan (step S204').

On the other hand, the device A transmits a history (history information) of operation information of the device A (information and the like measured by a sensor provided in the device A) to the user-side system 20A (step S205). The external storage device transmits a fuel price and demand prediction information to the user-side system 20B (step S206). The processing of steps S205 and S206 is not essential and may be data input via the user-side systems 20A and 20B, respectively.

The manufacturer sets a prediction curve and a starting value in the user-side system 20A. Specifically, the output unit 25A displays an input screen for prompting someone to input necessary information (step S207). (1) For example, the manufacturer inputs the current performance of the device A as a starting value to the input screen. The manufacturer inputs the performance of the device A when prescribed time has elapsed (a fill-in type input). Alternatively, the manufacturer α may refer to a current state of the device A with respect to a prescribed starting value and prescribed performance information after each passage of prescribed time to correct values thereof, or refer to an actual result in a change over time related to previous performance of the device A to correct values thereof, in terms of performance information of the device A. Alternatively, an actual result of a change over time related to previous performance of the device A may be diverted and set as future performance information of the device A. (2) For example, the manufacturer inputs information for specifying a computation model for computing the performance of the device A and an input value (a starting value) to the model. (3) For example, when operation information and history information have been acquired in step S205, the manufacturer inputs the performance information of the device A extracted from monitoring information thereof (step S211). At this time, the manufacturer inputs only information capable of being disclosed to the business operator side. The input information acquisition unit 22A acquires information input by the manufacturer and transmits the information to the information sharing system 30 via the communication unit 27A (step S212). In the information sharing system 30, the prediction information acquisition unit 32 acquires the information and records the information in the storage unit 36.

On the other hand, the business operator sets a prediction curve and a starting value in the user-side system 20B. Specifically, the output unit 25B displays an input screen for prompting someone to input necessary information (step S208). (1) For example, the business operator inputs a current amount of power generation (an operation plan) and a current fuel price as starting values to the input screen. The business operator inputs predicted values of the amount of power generation and the fuel price after the passage of prescribed time (a fill-in type input). Alternatively, for example, the business operator may refer to a current fuel price with respect to a starting value of the fuel price and a predicted value of the fuel price after each passage of prescribed time to correct values thereof or refer to actual results in a change over time in a previous fuel price to correct values thereof. Alternatively, an actual result of a change over time in a previous fuel price may be diverted and set as a future fuel price. (2) For example, the business operator inputs information for specifying a computation model for computing a target amount of power generation and a predicted value of the fuel price and an input value (a starting value) for the model. (3) For example, when the fuel price or the demand prediction has been acquired in step S206, the business operator inputs prediction information of the fuel price extracted from information thereof (step S213). At this time, the business operator inputs only information capable of being disclosed to the manufacturer side. The input information acquisition unit 22B acquires information input by the business operator and transmits the information to the information sharing system 30 via the communication unit 27B (step S214). In the information sharing system 30, the prediction information acquisition unit 32 acquires the information and records the information in the storage unit 36.

Next, in the information sharing system 30, the scenario computation unit 34 aggregates the prediction information acquired by the prediction information acquisition unit 32 and creates an adjusted scenario. Here, an example of a scenario will be described using FIG. 5.

Figure 5:
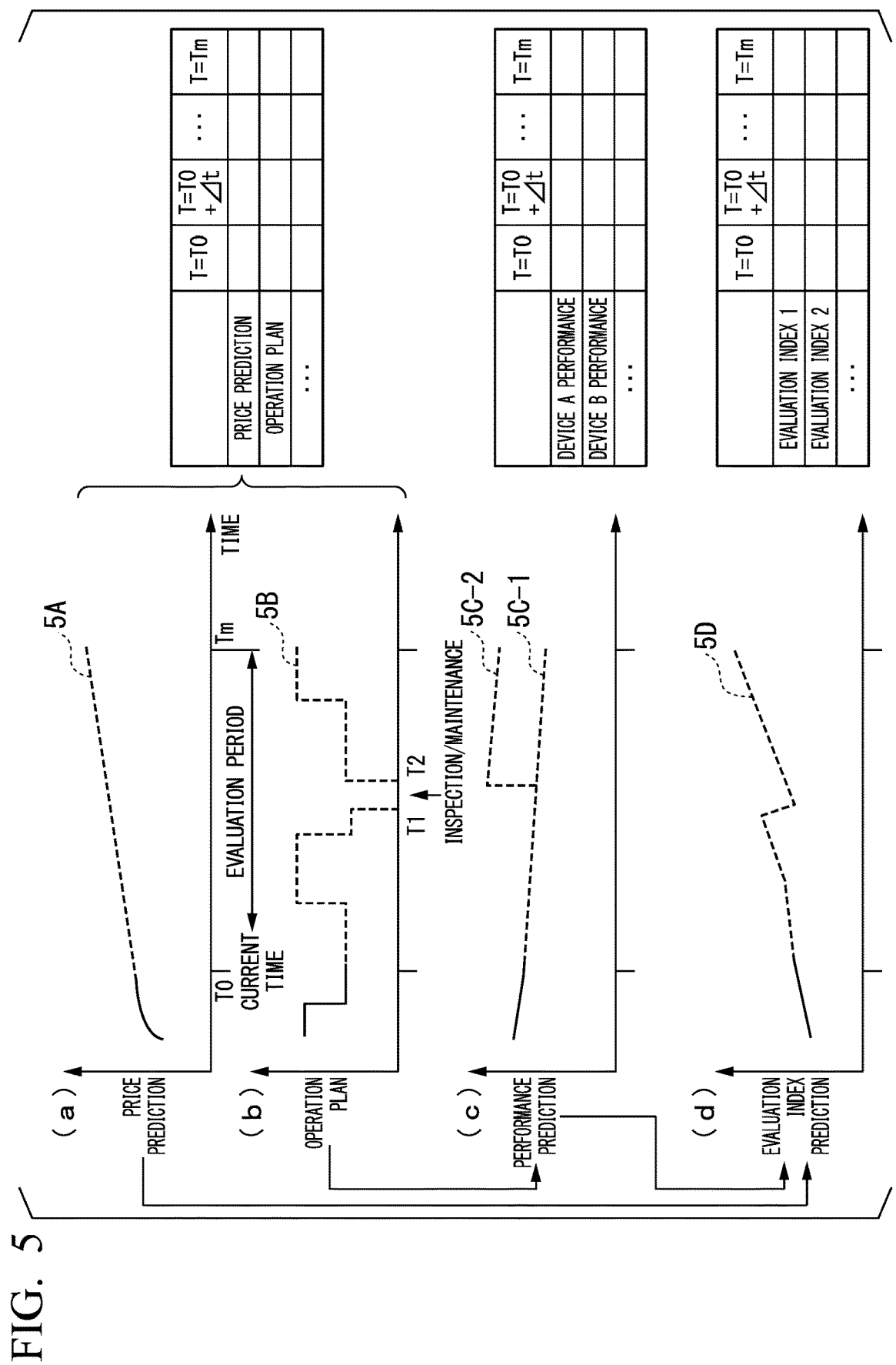
FIG. 5 is a diagram showing an example of a scenario used in the operation/maintenance management method of the integrated system according to the present invention.

FIG. 5 is a diagram showing an example of a scenario used in the operation/maintenance management method of the integrated system according to the present invention.

A graph 5A shown in FIG. 5($a$) represents fuel price prediction information computed by the scenario computation unit 34. A graph 5B shown in FIG. 5($b$) represents operation plan prediction information computed by the scenario computation unit 34.

A table shown on the right of these two graphs is an example of the input screen displayed in step S208. The business operator inputs a (current) fuel price of T=T0 and an operation plan (an amount of power generation, a period of operation time per day, or the like). The business operator inputs a fuel price and a predicted value of the operation plan during a prescribed future period (for example, T=T0+ΔT). The business operator inputs the fuel price and the predicted value of the operation plan for each prescribed period until Tm, which is the end time of the evaluation period. For example, the business operator inputs a scheduled value of a period in which maintenance is scheduled on the basis of the maintenance plan.

The prediction information computation unit 23B computes the change in the fuel price during the evaluation period (T0 to Tm) on the basis of the fuel price for each prescribed period input by the business operator, the economic prediction model of the storage unit 26B, and the like and generates prediction information (the graph 5A) shown in FIG. 5($a$). The prediction information computation unit 23B computes an operation plan during the evaluation period on the basis of the operation plan for each prescribed period input by the business operator, the operation knowhow DB of the storage unit 26B, and the like and generates the prediction information (the graph 5B) shown in FIG. 5($b$). The inspection/maintenance during a period from T1 to T2 in the graph 5B is based on the plan information input by the business operator. Solid lines of FIGS. 5($a$) and 5($b$) represent real data and broken lines thereof represent prediction information. The economic prediction model or the like used by the prediction information computation unit 23B is not a precise prediction model used by the business operator itself, but may be a prediction model estimated with accuracy capable of being disclosed to the manufacturer by the business operator. The prediction information computation unit 23B transmits the prediction information to the information sharing system 30 via the communication unit 27B.

The graph shown in FIG. 5($c$) represents performance prediction information of the device A computed by the scenario computation unit 34.

A table shown on the right of the present graph is an example of the input screen displayed in step S207. The manufacturer α inputs performance information of the device A and performance information of the device B at T=T0 (current time). The manufacturer α inputs performance information of the devices A and B during a prescribed future period (for example, T=T0+ΔT). The manufacturer α inputs predicted values of the performance information of the devices A and B for each prescribed period until the end time Tm of the evaluation period.

The prediction information computation unit 23A computes the change in performance information of the device A during an evaluation period (from T0 to Tm) on the basis of the performance information of the device A for each prescribed period input by the manufacturer α and a device performance model, a device degradation model, or the like of the storage unit 26A and generates prediction information (a graph 5C-1) shown in FIG. 5($c$). The prediction information computation unit 23A computes an operation plan during the evaluation period on the basis of the operation plan for each prescribed period input by the business operator and generates the prediction information (the graph 5C-1) shown in FIG. 5($c$). A solid line of FIG. 5($c$) represents real data and a broken line thereof represents prediction information. The performance degradation model or the like used by the scenario computation unit 34 may not be a more accurate model as long as accuracy at which the purpose of the index computation can be achieved is provided. The prediction information computation unit 23A transmits the prediction information to the information sharing system 30 via the communication unit 27A.

In the information sharing system 30, the scenario computation unit 34 aggregates the prediction information and creates an adjusted scenario. For example, the scenario computation unit 34 aggregates the prediction information of FIG. 5(b) and the graph 5C-1 in FIG. 5(c) to create a predicted scenario of the evaluation index reflecting the operation plan. At that time, the prediction information adjustment unit 33 computes an influence of inspection/maintenance on the device A during a period from T1 to T2 included in FIG. 5(b). More specifically, the prediction information adjustment unit 33 computes the performance information of the device A improved by inspection/maintenance. The prediction information adjustment unit 33 outputs performance information to the scenario computation unit 34. The scenario computation unit 34 generates prediction information (a graph 5C-2) reflecting performance information for improvement.

The prediction information shown in the graphs 5A, 5B, and 5C-2 constitute a part of the scenario and each piece of the prediction information is a scenario. The graph 5C-1 can also be used as a comparison target for ascertaining the effect of inspection/maintenance as a scenario when inspection/maintenance is not performed.

The graph shown in FIG. 5(d) is prediction information of the evaluation index created by the scenario computation unit 34.

The scenario computation unit 34 aggregates the graphs 5A, 5B, and 5C-2 and creates prediction information (a graph 5D) representing the change in the fuel cost during the evaluation period. For example, the scenario computation unit 34 computes the change in an amount of fuel necessary for execution of the operation plan on the basis of the operation plan prediction graph 5B and the performance prediction graph 5C-2. The scenario computation unit 34 creates the graph 5D by multiplying a required amount of fuel by the fuel price predicted in the graph 5A. If the performance of the device decreases as the operating time increases, the required amount of fuel increases even if a certain fixed amount of power generation is planned. If the performance of the device is improved after inspection/maintenance during a period of time from T1 to T2, an amount of power generation that is the same as an amount of power generation before inspection can be provided with less fuel. For this reason, the fuel cost also decreases after inspection/maintenance in the graph 5D. However, because the fuel price increases as shown in the graph 5A, the fuel cost is predicted to increase thereafter. The scenario computation unit 34 computes the fuel cost at time T0 and the fuel cost at time T0+ΔT, creates a table shown on the right of FIG. 5(d), and presents a table created through the user-side systems 20A and 20B to a manufacturer and a business operator.

As described above, the prediction information adjustment unit 33 adjusts the prediction information (the graph 5C-1) of a change over time in certain input information on the basis of prediction information of a change over time in other input information (performance information of the device A improved by inspection/maintenance) and the scenario computation unit 34 aggregates prediction information after the adjustment to create a scenario.

Returning to FIG. 4, the scenario computation unit 34 transmits a created scenario to the user-side system 20A via the communication unit 37 (step S215). In the user-side system 20A, the scenario editing unit 24A acquires information thereof via the communication unit 27A and displays the scenario via the output unit 25A (step S216). Likewise, the scenario computation unit 34 transmits the created scenario to the user-side system 20B via the communication unit 37 (step S217) and the scenario editing unit 24B displays the scenario via the output unit 25B (step S218).

On the other hand, the manufacturer checks details of the scenario and performs an editing operation on the scenario (step S219). For example, the manufacturer corrects the graph 5C-2 of FIG. 5. For example, when the performance improvement after inspection/maintenance is insufficient, the manufacturer corrects the graph so that the performance is further improved. When it is currently predicted that the performance degradation is more severe than that shown in the graph 5C-2 (or the performance degradation is predicted to be small) on the basis of operation information and history information acquired from the device A and the operation plan prediction graph 5B based on the information provided from the business operator, the manufacturer edits the graph 5C-2 so that the slope of the graph increases (decreases). The scenario editing unit 24A receives the editing operation of the manufacturer and creates the graph 5C-2 after editing. The scenario editing unit 24B transmits the graph 5C-2 after editing to the information sharing system 30 via the communication unit 27A (step S220). In the information sharing system 30, the scenario computation unit 34 acquires the graph 5C-2 after editing (a final scenario) via the communication unit 37 and records the graph 5C-2 after editing (the final scenario) in the storage unit 36.

The business operator checks details of the scenario and performs an editing operation (step S221). For example, the business operator edits the operation time so that the operation time is longer or shorter with respect to the graph 5B of FIG. 5. Alternatively, for example, the graph 5A representing the fuel price is edited to generate a graph in which an increase in the price is minimized.

The scenario editing unit 24B receives the editing operation of the business operator and creates the graphs 5A and 5B after editing. The scenario editing unit 24B transmits the graphs 5A and 5B after editing to the information sharing system 30 via the communication unit 27B (step S222). In the information sharing system 30, the scenario computation unit 34 acquires the graphs 5A and 5B after editing (a final scenario) via the communication unit 37 and records the graphs 5A and 5B after editing (the final scenario) in the storage unit 36.

Next, the scenario computation unit 34 reads the graphs 5A, 5B, and 5C-2 after editing from the storage unit 36, and re-creates the graph 5D based on the edited graphs 5A, 5B, and 5C-2. Next, the evaluation index computation unit 35 computes an evaluation index for the scenario. Specifically, the evaluation index computation unit 35 integrates fuel costs during the five-year evaluation period using the re-created graph 5D. The evaluation index computation unit 35 transmits a computed fuel cost to the user-side system 20A via the communication unit 37 (step S223). The user-side system 20A acquires an evaluation index value via the communication unit 27A and the output unit 25A outputs the evaluation index value (a five-year fuel cost) (step S224). The evaluation index computation unit 35 transmits the five-year fuel cost to the user-side system 20B via the communication unit 37 (step S225). The user-side system 20B acquires the fuel cost via the communication unit 27B and the output unit 25B outputs the fuel cost (step S226). The business operator and the manufacturer can iteratively perform editing of a scenario, inputting of prediction information, and the like and perform the creation of a scenario or the computation of an evaluation index value until they are mutually satisfied.

Next, an example in which whether or not to apply an upgraded component according to the evaluation index "fuel cost" is determined will be described.

Figure 6:
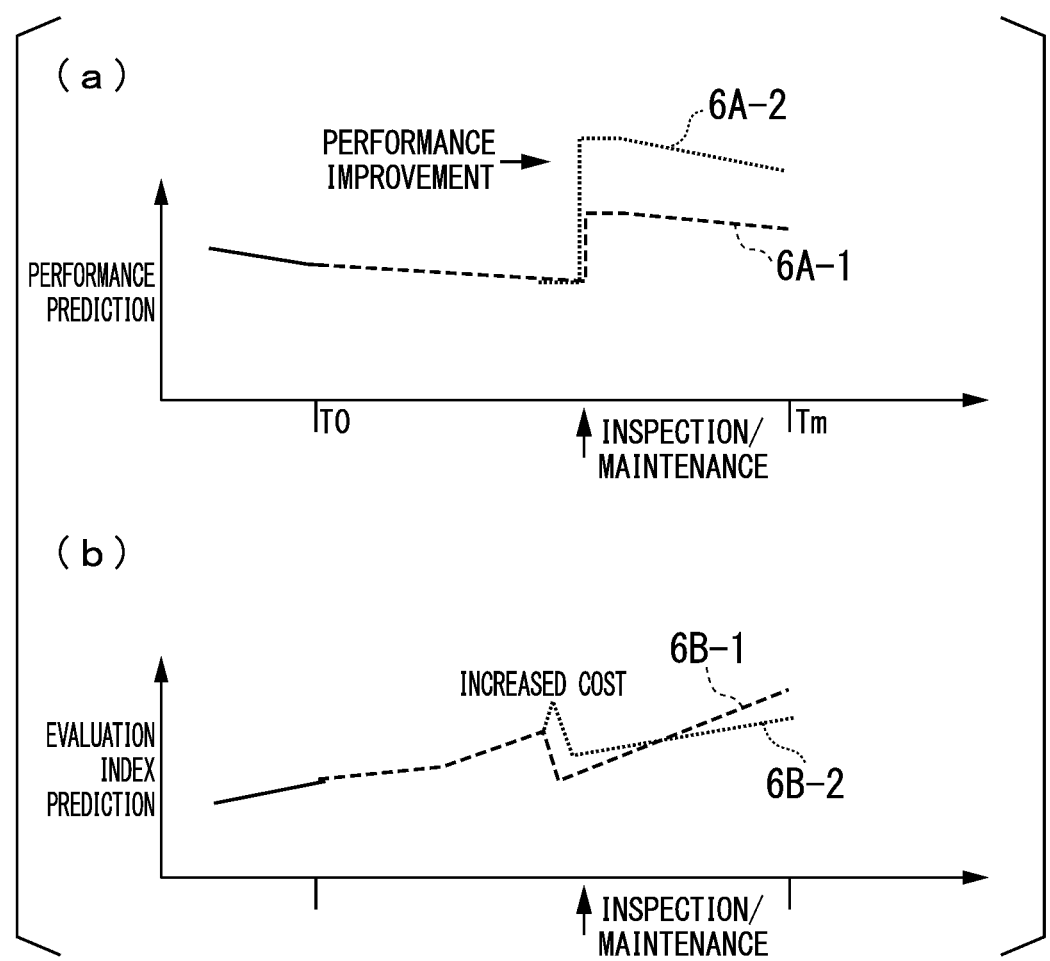
FIG. 6 is a diagram showing an example of a comparison of scenarios related to the presence and absence of an upgrade in the integrated system according to the present invention.

FIG. 6 is a diagram showing an example of a comparison of scenarios related to the presence and absence of an upgrade in the integrated system according to the present invention.

A scenario of the prediction information of the performance of the device A is shown in FIG. 6(a). A graph 6A-1 indicates prediction information of the performance of the device A when the repair of the device A or the like is performed without performing component replacement or the like with respect to inspection/maintenance. A graph 6A-2 indicates prediction information of the performance of the device A when an upgraded component is applied to device A in inspection/maintenance. If an upgraded component is applied as shown in FIG. 6, significant performance improvement can be expected.

FIG. 6(b) shows a comparative display example (step S16 of FIG. 3) of the evaluation index (the fuel cost). A graph 6B-1 indicates prediction information of the fuel cost when only a repair is performed on the device A in inspection/maintenance. A graph 6B-2 indicates prediction information of the fuel cost when replacement for the upgraded component is performed with respect to the device A in inspection/maintenance. When the upgraded component is applied as shown in FIG. 6(b), a temporary cost burden is caused. However, it is possible to have performance equivalent to that of a case in which an upgraded component is not applied with less fuel in a subsequent operation according to the performance improvement by the upgraded component. Accordingly, an increase in a cost after the upgrade can be minimized (the graph 6B-2).

As described above, according to the operation/maintenance management system 10 of the present embodiment, it is possible to determine whether or not the upgraded component can be introduced by evaluating the fuel cost from both the performance improvement due to the upgrade and the increase in the temporary cost due to the upgrade.

As described above, the operation/maintenance management system 10 includes the prediction information computation units 23A and 23B. Thereby, it is possible to set a maintenance plan and the like after computing an economic index in consideration of an influence of the performance degradation or the like due to the continuation of an operation of the integrated system 11 and a change in a fuel price.

According to the operation/maintenance management system 10, both the manufacturer and the business operator can share prediction information with high accuracy held by the manufacturer and the business operator (performance degradation information of a component or the like in the case of the manufacturer and the fuel price or the like in the case of the business operator) in a range in which information can be disclosed and interactively and comprehensively consider the optimization of an evaluation index on the basis of the information.

For example, in the fuel cost index computation in steps S211 and S213 in the sequence diagram of FIG. 4, necessary input information may be clearly shown on the input screen to the manufacturer and the business operator via the user-side systems 20A and 20B and the business operator and the manufacturer may mutually share information in a fill-in manner in which an input field is filled by the business operator and the manufacturer. As an example of an input screen (an input interface) to which the business operator and the manufacturer input necessary input information, a configuration in which an input field is displayed as in the table shown on the right of FIG. 5(a) or 5(c) and filled with items corresponding thereto may be adopted. That is, the user-side system 20A displays an input screen with a display item for price prediction and an operation plan and an input item for performance information of the devices A and B. The user-side system 20B displays an input screen with an input item for price prediction and an operation plan and a display item for performance information of the devices A and B. Then, if the manufacturer inputs performance information of the device A or the like, the user-side system 20B displays an input screen in which the performance information input to the display item of the device A by the manufacturer is displayed. When the business operator inputs information such as price prediction and operation plan, the user-side system 20A displays an input screen in which the information input to the display items for the price prediction and the operation plan by the business operator is displayed. By using such an interactive service, it is possible to set an optimized operation plan and maintenance plan while sharing prediction information and evaluation information within a range in which information can be mutually disclosed.

The prediction information computation units 23A and 23B may compute prediction information on the basis of a model and the scenario computation unit 34 may compute prediction information of an evaluation index on the basis of the model. According to such automation, an operation plan and a maintenance plan can be set in real time.

Other Examples

For example, an example in which the evaluation index is used as a "fuel cost" and an appropriate operation plan is selected or a determination of whether or not to upgrade a component is made has been described so far. Next, the operation/maintenance management system 10 will be described using an example in which a gas turbine repair/maintenance timing is set as a "timing when the economic efficiency degradation cost exceeds the repair/maintenance cost" for the evaluation index. The economic efficiency degradation cost is a lost profit due to performance degradation of the gas turbine. The economic efficiency degradation cost is represented by, for example, a sum of a decreased profit due to a decrease in power generation efficiency, an increased cost due to an increase in power consumption at a facility, an increased cost due to an increase in failure occurrence rate, and the like. The repair/maintenance cost is a cost necessary for performing the repair/maintenance.

Figure 7:
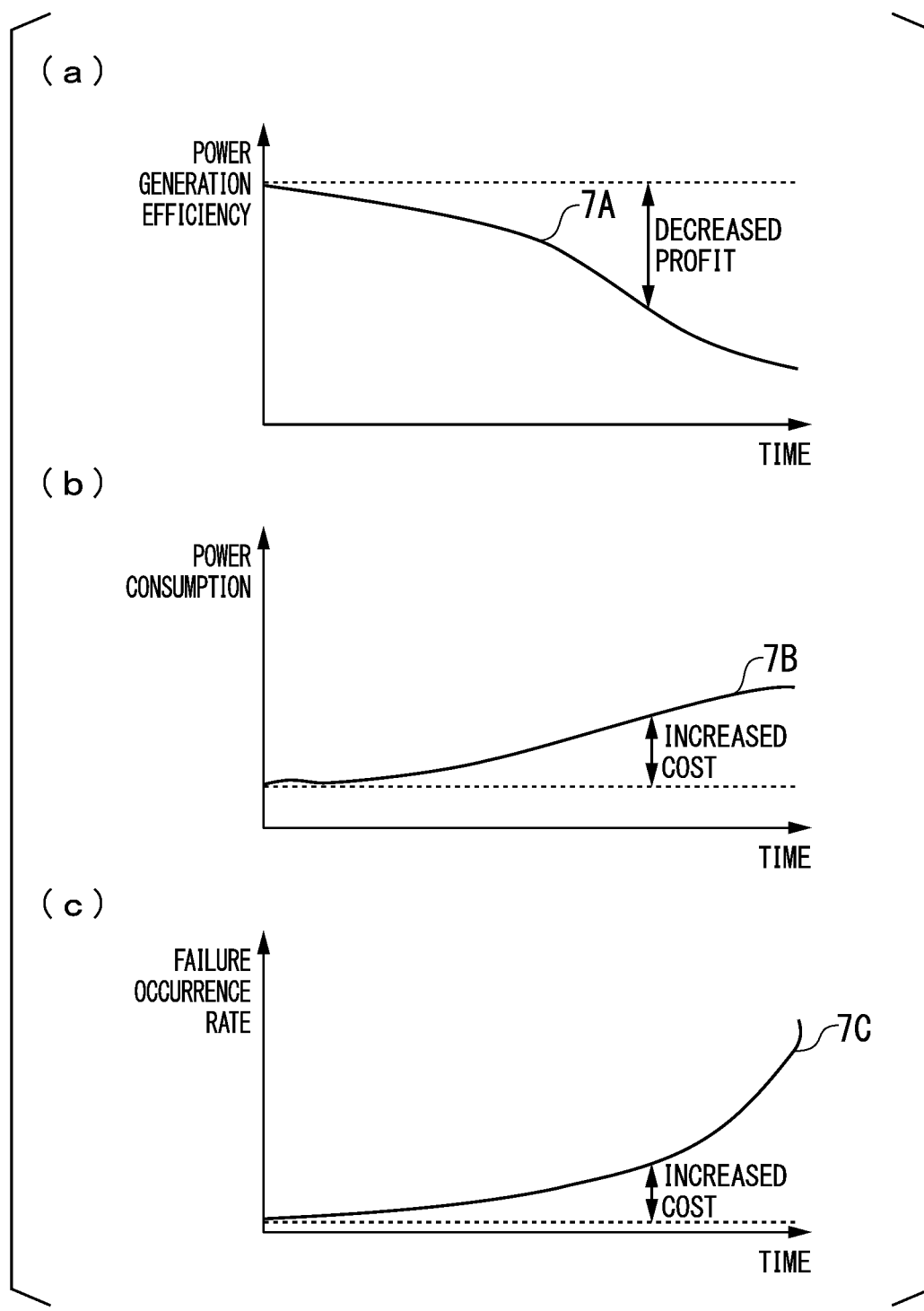
FIG. 7 is a diagram showing an example of cost evaluation when the operation/maintenance management method of the integrated system according to the present invention is applied to a power generation facility.

FIG. 7 is a diagram showing an example of cost evaluation when the operation/maintenance management method of the integrated system according to the present invention is applied to a power generation facility.

Prediction information (a graph 7A) representing a change over time in power generation efficiency is shown in FIG. 7(a). As shown in the graph 7A, the power generation efficiency of the gas turbine decreases as operation time increases due to aging degradation. If the power generation efficiency decreases, a profit from power sales decreases. The graph 7A is based on plant operation information, performance information, and a degradation model input to the user-side system 20A by the manufacturer.

Prediction information (a graph 7B) representing a change over time in power consumption by a power generation plant device is shown in FIG. 7(b). As shown in the graph 7B, power consumption of each device increases as the operation time increases due to aging degradation. When the power consumption increases, a cost required for power generation increases. The graph 7B is based on operation information, performance information, and a degradation model of a device provided in the gas turbine or a peripheral device input to the user-side system 20A by the manufacturer.

Prediction information (a graph 7C) representing a change over time in a failure occurrence rate due to a failure of the device provided in the gas turbine is shown in FIG. 7(c). As shown in the graph 7C, the failure occurrence rate of each facility increases with an increase in operation time due to aging degradation. When the failure occurrence rate increases, a maintenance cost for restoring the failure increases. The graph 7C is based on operation information, performance information, and a degradation model of each facility of the plant input to the user-side system 20A by the manufacturer.

The manufacturer and the business operator input a cost required for repairing a component of each device provided in the gas turbine and prediction information for computing a decreased profit due to stopping of an operation for maintenance to the user-side systems 20A and 20B. For example, the manufacturer inputs a cost required for repairing a component of each device and information representing a length of time in which an operation is stopped for each repair to the user-side system 20A. The business operator inputs information representing an economic loss per unit time due to the stopping of the operation (a lost profit due to the inability of power generation for the unit time) to the user-side system 20B. For example, the prediction information computation unit 23A computes cost prediction information required for repairing the component of each device provided in the gas turbine (the cost increases as the operation time increases in general). The prediction information computation unit 23B computes the prediction information of the lost profit due to the stopping of an operation (for example, the lost profit is changed even when the operation is stopped for the same time on the basis of future power sales unit prediction or the like). The scenario computation unit 34 aggregates the prediction information and computes the prediction information of the repair/maintenance cost.

Figure 8:
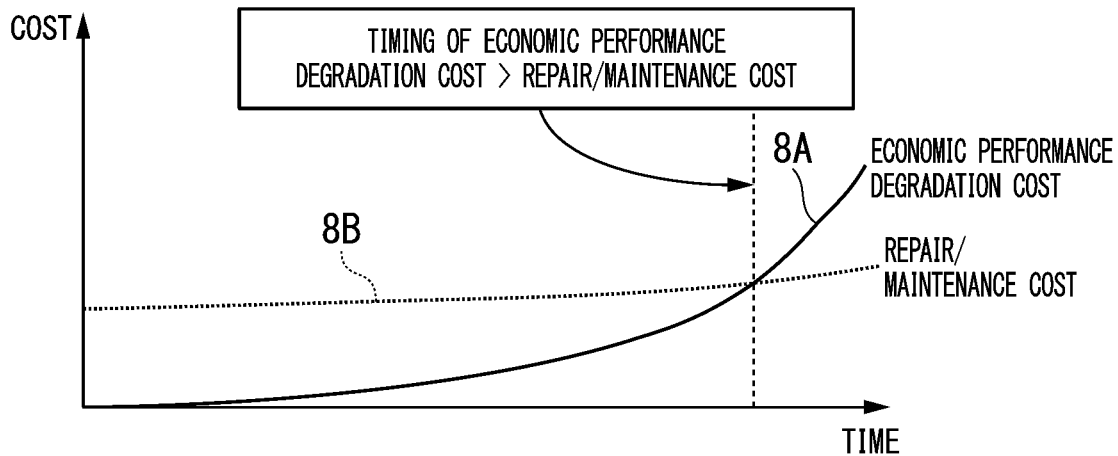
FIG. 8 is a diagram showing an example of cost-based maintenance plan setting when the operation/maintenance management method of the integrated system according to the present invention is applied to a power generation facility.

FIG. 8 is a diagram showing an example of cost-based maintenance plan setting when the operation/maintenance management method of the integrated system according to the present invention is applied to a power generation facility.

A graph 8A representing prediction information of an economic efficiency degradation cost and a graph 8B representing prediction information of a repair/maintenance cost are shown in FIG. 8.

In the information sharing system 30, the scenario computation unit 34 aggregates the graphs 7A, 7B, and 7C to compute the prediction information of the economic efficiency degradation cost (the graph 8A). The scenario computation unit 34 computes the prediction information of the repair/maintenance cost (the graph 8B) as described above. The graph 8A shows an example of a decrease in economic performance (an increase in a cost) due to performance degradation of the power plant. The decrease in the economic performance can be improved by restoring the performance of the device due to repair/maintenance. However, a cost is required to perform repair/maintenance. The graph 8B shows an example of a decrease in economic efficiency (an increase in a cost) caused by repair/maintenance. Because a subsequent economic efficiency degradation cost can be minimized even if repair/maintenance costs are temporarily caused when repair/maintenance is performed, this leads to cost reduction from a long-term viewpoint. FIG. 8 is a diagram in which an "economic efficiency degradation cost" and a "repair/maintenance cost" are compared and displayed when the evaluation index is set as a "timing when the economic efficiency degradation cost exceeds the repair/maintenance cost".

Next, the evaluation index computation unit 35 computes a timing of repair/maintenance cost<economic efficiency degradation cost and sets the economically optimized repair/maintenance schedule.

Figure 9:
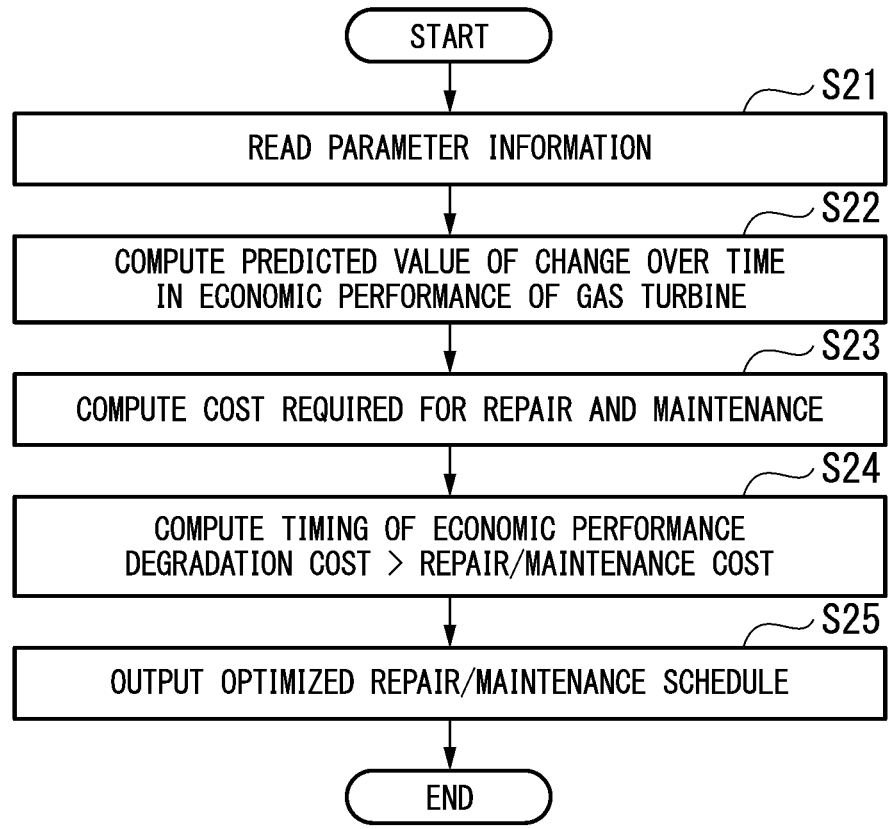
FIG. 9 is a flowchart showing an example of cost-based maintenance plan setting when the operation/maintenance management method of the integrated system according to the present invention is applied to a power generation facility.

FIG. 9 is a flowchart showing an example of cost-based maintenance plan setting when the operation/maintenance management method of the integrated system according to the present invention is applied to a power generation facility.

First, the prediction information computation units 23A and 23B read parameter information (performance information, a degradation model, an economic loss due to the stopping of an operation, or the like) input by the manufacturer and the business operator (step S21). The prediction information computation units 23A and 23B compute a predicted value of a change over time in the economic performance of the gas turbine. The scenario computation unit 34 computes prediction information (the graph 8A) of the economic efficiency degradation cost by aggregating a plurality of predicted values of a change over time (step S22). The scenario computation unit 34 aggregates a cost of a repair, a period of time required for a repair, and prediction information of an economic loss per unit time due to the stopping of an operation and computes prediction information of the repair/maintenance cost (a graph 8B) (step S23). Next, the evaluation index computation unit 35 computes a timing of economic efficiency degradation cost>repair/maintenance cost (step S24). The evaluation index computation unit 35 transmits the computed timing to the user-side systems 20A and 20B. In the user-side system 20A, the output unit 25A outputs an optimized repair/maintenance schedule. In the user-side system 20B, the output unit 25B outputs an optimized repair/maintenance schedule (step S25).

In the conventional repair/maintenance schedule setting, for example, the schedule is set to minimize the operation stop time and the economic performance due to the degradation of the device is not considered. According to the operation/maintenance management system 10 of the present embodiment, because the degradation of the economic performance of the gas turbine is taken into consideration, an economically optimum repair or maintenance schedule can be set.

When an improvement proposal from a manufacturer is made as described above, if the maintenance schedule set by the business operator is used as a reference scenario, the reference scenario is edited, the edited reference scenario is used as a scenario reflecting a new maintenance schedule proposed by the manufacturer, and results of computing evaluation indices for the two scenarios are compared, it is possible to convey an effect of a proposal of the manufacturer to the business operator in an easy-to-understand manner.

(Hardware Configuration)

Figure 10:
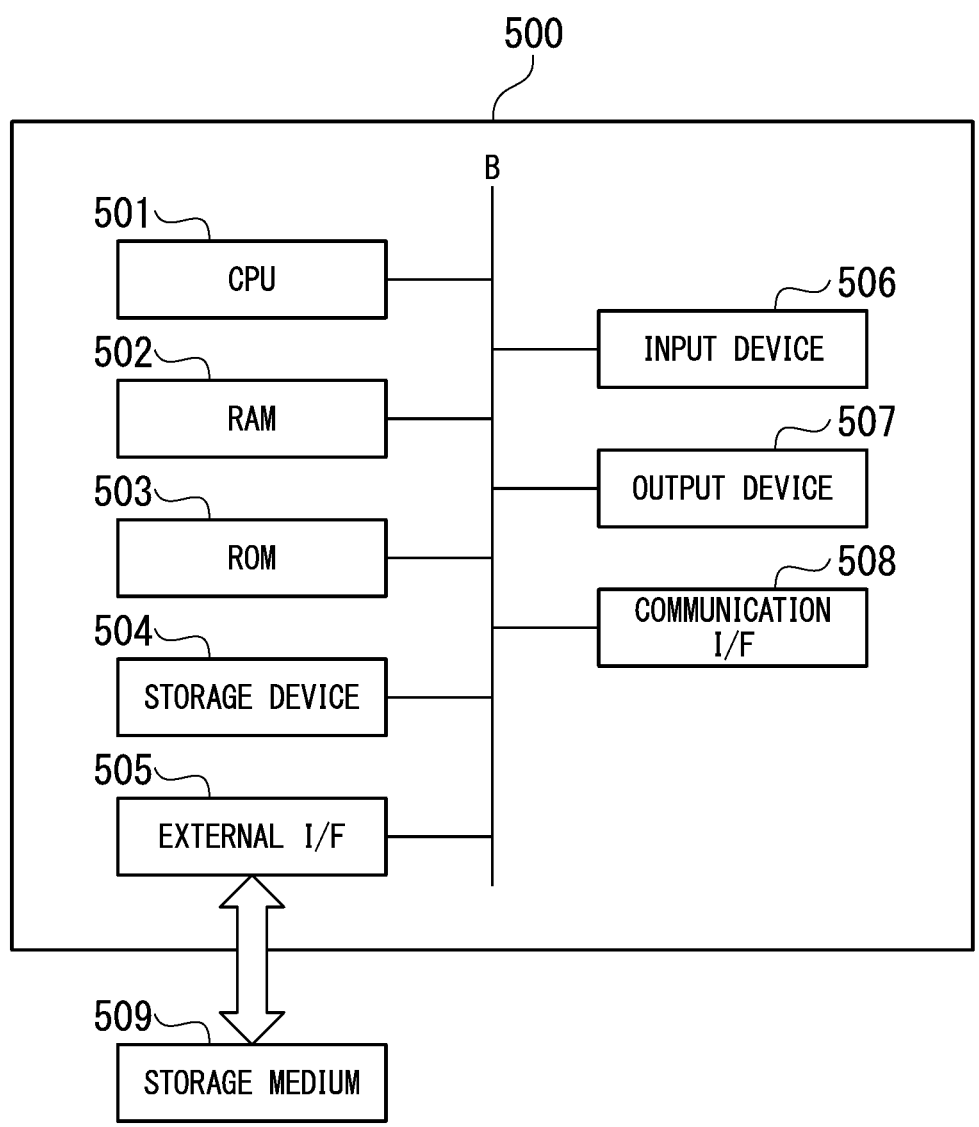
FIG. 10 is a hardware configuration diagram showing an example of an embodiment of the operation/maintenance management method of the integrated system according to the present invention.

The user-side systems 20A and 20B and the information sharing system 30 can be implemented using, for example, a general computer 500. FIG. 10 shows an example of the configuration of the computer 500.

FIG. 10 is a diagram showing an example of a hardware configuration of the user-side systems 20A and 20B and the information sharing system 30 according to the present invention.

The computer 500 includes a central processing unit (CPU) 501, a random access memory (RAM) 502, a read only memory (ROM) 503, a storage device 504, an external interface (I/F) 505, an input device 506, an output device 507, a communication. I/F 508, and the like. These devices transmit and receive signals to and from each other via a bus B.

The CPU 501 is a computation device configured to implement each function of the computer 500 by reading a program and data stored in the ROM 503, the storage device 504, and the like onto the RAM 502 and executing a process. For example, the prediction information computation units 23A and 23B and the scenario computation unit 34 described above and the like have functions provided in the computer 500 when the CPU 501 reads and executes a program stored in the ROM 503 or the like. The RAM 502 is a volatile memory used as a work area for the CPU 501. The ROM 503 is a nonvolatile memory configured to hold programs and data even when the power supply is turned off. The storage device 504 is implemented by, for example, a hard disk drive (HDD), a solid state drive (SDD), and the like, and stores an operation system (OS), an application programs, various types of data, and the like. The external I/F 505 is an interface associated with an external device. For example, the external device includes a recording medium 509 and the like. The computer 500 can perform reading and writing from and to the recording medium 509 via the external I/F 505. The recording medium 509 includes, for example, an optical disk, a magnetic disk, a memory card, a universal serial bus (USB) memory, and the like.

The input device 506 includes, for example, a mouse, a keyboard, and the like and receives an instruction of an operator to input various types of operations and the like to the computer 500. For example, the output device 507 is implemented by a liquid crystal display and displays a processing result from the CPU 501. The communication I/F 508 is an interface configured to connect the computer 500 to a network such as the Internet by means of wired communication or wireless communication. The bus B is connected to each of the above-described constituent devices and transmits and receives various types of control signals and the like between the control devices.

Steps of processes of the above-described user-side systems 20A and 20B and information sharing system 30 are stored in a computer-readable recording medium in the form of a program and the above-described processes are performed by a computer of an operation/maintenance management system reading and executing this program. Here, the computer-readable recording medium refers to a magnetic disk, a magneto-optical disc, a CD-ROM, a DVD-ROM, a semiconductor memory, or the like. Also, this computer program may be delivered to a computer through a communication circuit and the computer receiving the delivered computer program may execute the program.

Also, the above-described program may be a program for implementing some of the above-described functions. Further, the above-described program may be a program capable of implementing the above-described functions in combination with a program already recorded on the computer system, i.e., a so-called differential file (differential program).

The user-side systems 20A and 20B and the information sharing system 30 may include a single computer or may include a plurality of connected computers so that communication is possible.

In addition, it is possible to appropriately replace a component in the above-described embodiment with a well-known component without departing from the scope and spirit of the present invention. The technical scope of the present invention is not limited to the above-described embodiments and various changes can be made without departing from the scope and spirit of the present invention.

For example, in an integrated system including a plurality of components or devices such as an industrial plant including a gas turbine or an aircraft, the present invention can be applied to a system in which an appropriate operation, systematic maintenance, and management of an upgrade or the like are required to be performed.

INDUSTRIAL APPLICABILITY

According to the above-described operation/maintenance management method, program, and operation/maintenance management system, it is possible to share information necessary for computation of an index to be pursued in the business between business operators and manufacturers in order to optimize an evaluation index of an integrated system. As a result, more advanced optimization of an evaluation index in which operation information and device information of each component of an integrated system are comprehensively reflected is implemented. Furthermore, options and uncertainties in future prediction are represented in individual scenarios, which provide useful insights in decision making for operation and maintenance plans of an integrated system.

REFERENCE SIGNS LIST

10 Operation/maintenance management system
20A, 20B User-side system
21A, 21B Setting information reception unit
22A, 22B Input information acquisition unit
23A, 23B Prediction information computation unit
24A, 24B Scenario editing unit
25A, 25B Output unit
26A, 26B Storage unit
27A, 27B Communication unit
30 Information sharing system
31 Setting information reception unit
32 Prediction information acquisition unit
33 Prediction information adjustment unit
34 Scenario computation unit
35 Evaluation index computation unit
36 Storage unit
37 Communication unit

What is claimed is:

1. An operation/maintenance management method of an integrated system including a plurality of components or devices, the operation/maintenance management method comprising steps of:
  selecting an index and a period for evaluating the integrated system;
  acquiring prediction information representing a change over time in publicly available input information for use in computation of the index input from information including confidential information by each of a user who performs an operation of the integrated system and manufacturers of the components or the devices, the confidential information being held by each of the user and the manufacturers;
  creating a future prediction scenario by combining the input information; and
  computing an evaluation index related to the scenario.

2. The operation/maintenance management method according to claim 1, further comprising steps of:
displaying the future prediction scenario; and
comparing and displaying evaluation index computation results related to a plurality of scenarios.

3. The operation/maintenance management method according to claim 1, wherein, in a step of acquiring prediction information representing the change over time in the input information, a part or all of the input information is able to be input by an input interface in a fill-in form.

4. The operation/maintenance management method according to claim 1, wherein, in a step of acquiring prediction information representing the change over time in the input information, information is simplified to details capable of being disclosed by a holder with respect to a part or all of the input information and is incorporated into the scenario.

5. The operation/maintenance management method according to claim 1, wherein, in a step of creating the future prediction scenario, prediction information of a change over time in certain input information is adjusted on the basis of prediction information of a change over time in other input information.

6. The operation/maintenance management method according to claim 1, wherein a part or all of the input information is corrected with reference to a current state of the integrated system as a starting value of prediction information of a change over time.

7. The operation/maintenance management method according to claim 1, wherein a part or all of the input information is corrected or diverted with reference to actual results of a previous change over time in the integrated system as prediction information of a change over time.

8. The operation/maintenance management method according to claim 1, wherein the input information includes maintenance plan information of the integrated system.

9. The operation/maintenance management method according to claim 1, wherein the input information includes operation plan information of the integrated system.

10. The operation/maintenance management method according to claim 1, wherein the input information includes prediction information of a change over time in performance of the integrated system.

11. The operation/maintenance management method according to claim 1, wherein the index is evaluated on the basis of a lost profit due to performance degradation of the integrated system and a cost required for improving performance of the integrated system.

12. The operation/maintenance management method according to claim 11, wherein a repair or maintenance plan is set on the basis of the lost profit due to the performance degradation of the integrated system and the cost required for improving the performance of the integrated system.

13. The operation/maintenance management method according to claim 1,
wherein the integrated system is a power generation facility, and
wherein the index is evaluated on the basis of a lost profit from a sum of a decreased profit due to a decrease in power generation efficiency, an increased cost due to an increase in power consumption in the facility, and an increased cost due to an increase in a failure occurrence rate and a sum of a cost required for a repair or component replacement and a cost caused by stopping an operation for maintenance.

14. A program for causing a computer of an operation/maintenance management system of an integrated system including a plurality of components or devices to function as:
a means for acquiring an index and a period for evaluating the integrated system;
a means for acquiring prediction information representing a change over time in publicly available input information for use in computation of the index input from information including confidential information by each of a user who performs an operation of the integrated system and manufacturers of the components or the devices, the confidential information being held by each of the user and the manufacturers;
a means for creating a future prediction scenario by combining the input information; and
a means for computing an evaluation index related to the scenario.

15. An operation/maintenance management system of an integrated system including a plurality of components or devices, the operation/maintenance management system comprising:
a setting information reception unit configured to acquire an index and a period for evaluating the integrated system;
a prediction information acquisition unit configured to acquire prediction information representing a change over time in publicly available input information for use in computation of the index input from information including confidential information by each of a user who performs an operation of the integrated system and manufacturers of the components or the devices, the confidential information being held by each of the user and the manufacturers;
a scenario computation unit configured to create a future prediction scenario by combining the input information; and
an evaluation index computation unit configured to compute an evaluation index related to the scenario.

* * * * *